United States Patent [19]

Heinemann et al.

[11] 4,099,802
[45] Jul. 11, 1978

[54] HYDROSTATIC BEARING UNIT AND A HYDROSTATIC BEARING ASSEMBLY COMPRISING SEVERAL SUCH BEARING UNITS

[75] Inventors: Otto Heinemann, Ennigerloh; Werner Schossler, Ahlen; Helmut Lucke, Neubeckum; Helmut Krumme, Liesborn; Burkhard Heiringhoff, Celde, all of Fed. Rep. of Germany

[73] Assignee: Polysius AG, Neubeckum, Fed. Rep. of Germany

[21] Appl. No.: 765,244

[22] Filed: Feb. 3, 1977

[30] Foreign Application Priority Data

Feb. 7, 1976 [DE] Fed. Rep. of Germany ....... 2604889

[51] Int. Cl.² .............................................. F16C 7/04
[52] U.S. Cl. ....................................... 308/9; 308/5 R; 308/73; 308/160
[58] Field of Search .................... 308/9, 160, DIG. 1, 308/73, 5 R; 100/170; 92/103 M, 103 SD, 103 F

[56] References Cited

U.S. PATENT DOCUMENTS

| | | | |
|---|---|---|---|
| 2,250,674 | 7/1941 | McBurney | 92/103 F |
| 3,566,899 | 3/1971 | Bowditch | 92/103 M |
| 3,661,060 | 5/1972 | Bowen | 92/103 SD |
| 3,782,793 | 1/1974 | Sinner | 308/160 |
| 3,801,165 | 4/1974 | Lombard | 308/9 |
| 3,994,367 | 11/1976 | Christ | 308/9 |

Primary Examiner—Trygve M. Blix
Assistant Examiner—Reinhard J. Eisenzopf
Attorney, Agent, or Firm—Jones, Thomas & Askew

[57] ABSTRACT

This invention relates to a hydrostatic bearing unit for rotating parts, and more especially to a radial bearing unit for heavy machine parts, such as drums, comprising a fixed base and a shoe which is mounted for limited gyration relative to the base and for hydraulic adjustment with respect to the rotating parts and which comprises a bearing surface fed with hydraulic carrier medium. The invention also relates to a hydrostatic bearing assembly comprising several such bearing units.

19 Claims, 17 Drawing Figures

HYDROSTATIC BEARING UNIT AND A HYDROSTATIC BEARING ASSEMBLY COMPRISING SEVERAL SUCH BEARING UNITS

Heavy rotating machine parts, especially those with relatively large dimensions such as, for example, races and friction rings of drums, hollow journals or hollow shafts and the like, are being hydrostatically mounted to an ever increasing extent. On account of their large dimensions and the severe loads to which they are subjected, these rotating machine parts undergo elastic deformation, in addition to which allowance has to be made for manufacturing tolerances, so that these machine parts do not always run strictly true. In order to be able uniformly to mount the machine parts under these conditions, it is standard practice to form a hydrostatic bearing assembly with several individual hydrostatic bearing units which, through their bearing or contact surface, individually and adjustably support the rotating machine part for sliding movement.

It is known that the bearing (or one or more flat recesses formed therein) of the bearing shoe of a hydrostatic bearing unit can be fed with hydraulic carrier medium (for example oil) under pressure during operation. When the pressure of this carrier medium has reached a level governed by the load, the rotating machine part is lifted off the bearing surface to a slight extent, resulting in the creation of a gap which applies a throttling effect to the carrier medium which then flows off through that gap. The height of this gap (i.e. the distance between the bearing surface of the bearing unit and the contact surface of the rotating part) is a function of the load and, hence, of the pressure, fluid flow and viscosity of the carrier medium. The fluid flow is designed in such a way that a gap between 0.1 and 0.2 mm wide is adjusted in heavy machine construction.

In many cases, large rotating machine parts also move with a certain gyrating motion and/or even with a certain tilt in the vicinity of each bearing unit or each bearing, with the result that provision must be made for each bearing unit to make a limited gyrating movement in order to maintain a substantially constant gap between the contact surface of the machine part and the bearing surface of the hydrostatic bearing unit. Otherwise only a low hydrostatic pressure would be present as a result of the unimpeded egress of a carrier medium in the bearing surface, so that the bearing unit would be deprived of its bearing strength and the rotating part would be in danger of coming into contact with the bearing shoe.

In order to obtain this gyrating movement and adjustability of the bearing shoe carrying the bearing surface, it is known, for example from DT-AS No. 2,049,402, that a ball support can be provided between the bearing shoe and the base of the bearing, a hydraulic balance being provided to reduce the frictional forces between the ball and the bearing shoe, which inhibits the gyrating movement, through the association of a cylinder-and-piston assembly. In other embodiments generally known in practice, the gyrating movement of the bearing shoe is also obtained through the provision of a ball joint.

One particular disadvantage of these known embodiments is the considerable outlay in terms of design which is involved in obtaining the gyrating movement of the bearing shoe, the balls or spherical surfaces provided having to be produced with relatively high precision, resulting overall in an extremely expensive construction. In addition, heavily stressed seals and other components subjected to friction are exposed to increased wear in these known hydrostatic bearings and bearing units, with the result that leakage losses can frequently occur, resulting in operational disturbances which require greater maintenance work. Since in addition all the bearing units in a hydrostatic bearing assembly comprising several individual bearing units are combined in control series, a fault affecting one bearing unit will frequently result in failure of the entire hydraulic control system and, hence, the entire bearing.

Accordingly, the object of the present invention is to provide a hydrostatic bearing unit of the kind described above which is distinguished by its simple construction, its simplified manufacture and its reliability in operation and which is particularly suitable for a substantially problem-free common hydraulic control of several such bearing units of a hydrostatic bearing assembly.

According to the invention, this object is largely achieved by virtue of the fact that the bearing shoe is connected to the base of the bearing through a hydraulically operable supporting membrane.

In the embodiment according to the invention, the bearing shoe is as it were supported on the associated bearing base by a hydraulic membrane. The design and arrangement of this supporting membrane provides for a limited gyrating movement and for adjustable support of the bearing shoe. Although, in a supporting membrane of this type, the gyrating movement or deflectability is somewhat more limited than in conventional ball mountings, it is nevertheless entirely adequate for practical purposes. The supporting membrane, which is displaceable in the loading direction of the bearing base, has excellent guiding properties in its plane perpendicular to the loading direction, developing adequate restoring forces in contrast to a ball.

Particularly important advantage of this embodiment equipped with a supporting membrane in accordance with the invention over conventional bearing units are above all the fact that considerably fewer and more readily manufactured structural elements are required, the fact that no mechanical wear occurs by virtue of the omission of joints and special-purpose seals so that, on the one hand, maintenance work can be considerably reduced and, on the other hand, reliability in operation is increased, and finally the fact, in overall terms, the costs involved in producing a hydrostatic bearing unit of the type in question can be considerably reduced.

According to the invention, the supporting membrane may be made both in a single layer and also in several layers from identical or different materials (preferably metal), so that it may be optimally produced in regard to its supporting function and gyrating movement for the particular application envisaged for the associated hydrostatic bearing unit.

According to one aspect of the invention, it is particularly favourable for the supporting membrane, in its inoperative position, to be substantially in a plane which extends substantially parallel to the plane containing the bearing surface and to close at least partly one side of a pressure-tight hydraulic chamber which communicates with a source of hydraulic carrier medium and contains a cushion of that supporting medium which acts hydraulically on the supporting membrane. In this way, the bearing shoe can be adjusted with considerable precision relative to the rotating machinepart by correspondingly filling the hydraulic chamber.

In order to prevent the supporting membrane from rupturing during filling of the hydraulic chamber, it is best for the supporting membrane to be secured at its outer edge to the peripheral wall of the hydraulic chamber by a supporting ring which has a smaller internal diameter than the hydraulic chamber.

If, in the latter case, the supporting membrane is made for example of sheet steel, it will be of advantage for the supporting membrane to be elastically embedded on at least one side of its peripheral anchorage. In this way, influences of the relatively hard edge anchorage upon the deflectability of the supporting membrane and hence upon the gyrating movement of the bearing shoe will be elastically absorbed around the periphery (for example by corresponding rubber or plastics inserts).

A hydrostatic bearing unit according to the invention preferably comprises separate feed ducts for the bearing surface and for the hydraulic chamber.

In an embodiment such as this, it is possible, according to another aspect of the invention, to supply the bearing surface and the hydraulic chamber with oil through a common oil supply pipe which communicates directly with the hydraulic chamber, whilst the bearing surface directly communicates with the hydraulic chamber through its feed duct.

According to another aspect of the invention, the feed duct to the bearing surface is guided through at least one control chamber which is divided up by another membrane acting as control membrane into an air chamber communicating with the atmosphere and an oil chamber communicating with the bearing surface, the point at which the feed duct opens into the oil chamber being opposite the centre of the control membrane in such a way that a throttle zone in the form of a ring nozzle is formed by varying the distance between the orifice of the duct and the control membrane. By virtue of this embodiment of the invention, it is possible to control the flow of hydraulic carrier medium (especially oil) in dependence upon the pressure prevailing at the bearing surface of the bearing shoe. If, therefore, the static pressure in the vicinity of the bearing surface increases, the pressure in the oil chamber and, hence, at the control membrane increases to the same extent, with the result that the control membrane is deflected more towards the atmosphere (i.e. towards the air chamber), so that the distance between the feed duct orifice and the control membrane is increased, with the result that more carrier medium is able to flow through the oil chamber to the bearing surface.

According to the invention, a hydrostatic bearing assembly is formed with several such bearing units, the arrangement being such that, for controlling and monitoring the individual bearing units, at least the bearing surfaces of the bearing shoe communicate with a common source of hydraulic carrier medium through feed lines in which valves, control devices and at least one pump are present in known manner. By virtue of the previously explained configuration and functionality of the individual bearing units, this particular embodiment of the hydrostatic bearing assembly according to the invention is distinguished by its simple construction and, above all, by its high reliability in operation.

Depending upon the embodiment selected for the hydrostatic bearing unit, the individual delivery lines may also be individually used for simultaneously feeding the bearing surface and the hydraulic chamber of the corresponding bearing unit. In this case, the individual bearing units may be supplied with hydraulic carrier medium from the main feed line with or without control or metering possibilities and, hence, with or without an oil flow distributor, depending upon the configuration of the individual bearing units.

Further details of the invention will become apparent from the remaining Subsidiary Claims and also from the embodiments described by way of example in the following with reference to the accompanying, purely diagrammatic drawings, wherein:

Figure 1:
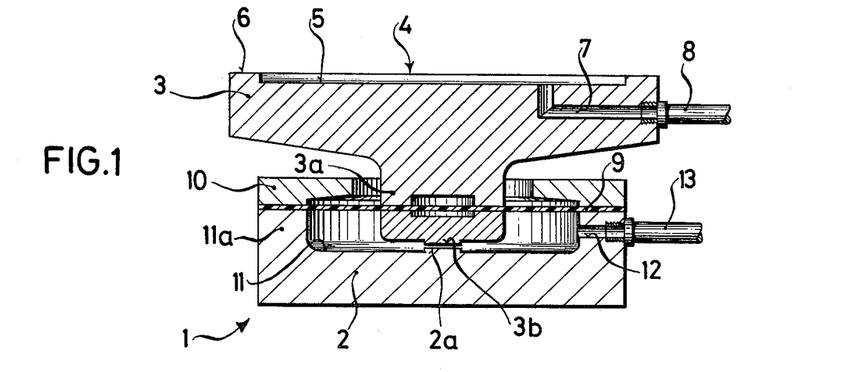
FIG. 1 is a vertical section (on the line I—I in FIG. 3) through a first embodiment of a hydrostatic bearing unit according to the invention.
Figure 2:
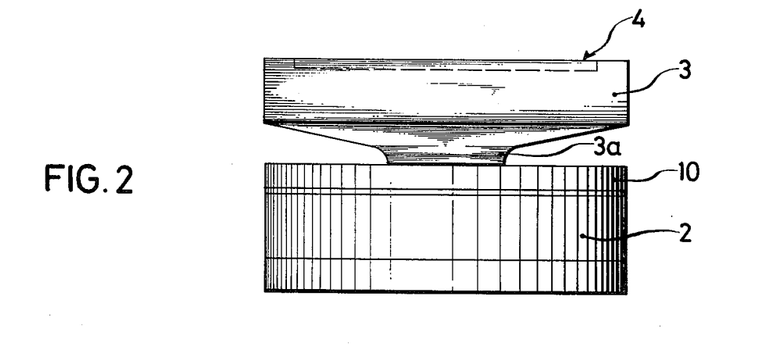
FIG. 2 is a side elevation of the bearing unit shown in FIG. 1.
Figure 3:
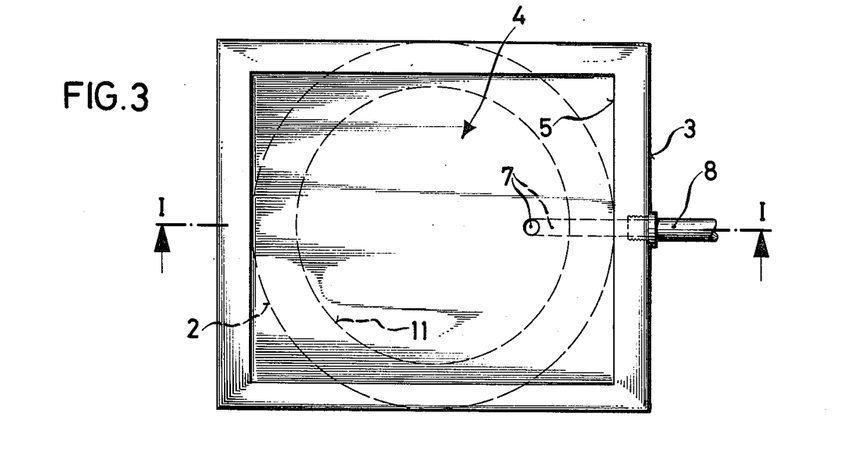
FIG. 3 is a plan view of the bearing unit shown in FIG. 1.

FIGS. 1 to 3 show a first embodiment of a hydrostatic bearing unit 1 according to the invention which is intended in particular to act as a radial bearing unit for heavy machine parts of the type mentioned earlier on. This bearing unit 1 contains a fixed base 2 and a shoe 3 which is mounted for limited gyration relative to the base 2 and which comprises a bearing surface 4 fed with hydraulic carrier medium, preferably an oil under pressure.

The bearing surface 4 of the bearing shoe 3 is formed with an oil pocket 5 which is open towards the rotating machine part (not shown) and which, in this case, has the same depth throughout and is surrounded on all sides by a fillet-like edge 6 (cf. in particular FIG. 3) on which the rotating machine part rests in its inoperative position, but off which the rotating machine part is lifted a certain distance in operation by the carrier oil delivered under pressure, as will be explained hereinafter. This carrier oil is directly delivered to the oil pocket 5 through a separate feed duct 7 which is provided in the bearing shoe 3 and which communicates directly with a feed pipe 8.

As can clearly be seen above all from FIG. 1, the lower end of the bearing shoe 3 is in the form of a pin 3a of reduced diameter through which the bearing shoe 3 is connected by a supporting membrane 9 to the base 2, thereby providing for the above-mentioned gyrating movement of the bearing shoe relative to the base of the bearing. In its rest position, this supporting membrane 9 extends substantially in a plane which lies substantially parallel to the plane containing the bearing surface 4 (cf. in particular FIG. 1). In addition, this supporting membrane 9 partly closes one side of a pressure-tight hydraulic chamber 11 which communicates through a feed duct 12 provided in the base 2 and through a separate feed pipe 13 connected thereto with a source of hydraulic carrier medium (preferably oil under pressure again), so that an oil cushion acting hydraulically on the supporting membrane 9 is formed in this hydraulic chamber 11. As shown by FIG. 1, the hydraulic chamber is formed coaxially and symmetrically in the base 2 (seen in outline in FIG. 3) in this particular embodiment.

The supporting membrane 9 is secured at its outer edge to the peripheral wall 11a of the hydraulic chamber 11 by a supporting ring 10 which has a smaller internal diameter than the hydraulic chamber 11 (cf. FIG. 1). By virtue of this configuration and association of the supporting ring 10 with the supporting membrane 9, the supporting membrane can be prevented from rupturing in the upward direction (when the hydraulic cushion is filled).

As mentioned earlier on, the supporting membrane 9 may be produced in one or more layers from different materials. When the supporting membrane 9 is made of metal, for example steel plate, it is best of the supporting membrane 9 to be elastically embedded on at least one side of its peripheral anchorage in order to reduce the influences of the relatively hard peripheral anchorage.

Whereas the supporting membrane 9 is secured at its edge to the base 2 of the bearing, its central region is anchored in the preferably two-piece (see FIG. 1) bearing shoe pin 3a.

In order, in the vent of the bearing unit 1 being overloaded to prevent the supporting membrane 9 from rupturing, a central projection is provided on at least one of the opposite sides of the foot 2 and the displaceable shoe 3. In the example illustrated in FIG. 1, a central recess forming the above-mentioned projection is provided both at the lower end of the bearing shoe pin 3a and also at the centre of the hydraulic chamber 11 of the base 2. In this hydrostatic bearing unit 1 according to the invention, therefore, the supporting membrane 9 provides above all for the required gyrating movement of the bearing shoe 3 relative to the base 2, whilst the fact that the membrane 9 can be hydraulically activated (by the oil cushion in the hydraulic chamber 11) provides for extremely accurate hydraulic adjustability of the bearing shoe 3 relative to the rotating machine part. According to the invention, all this can be ahieved with extremely simple structural means.

Figure 4:
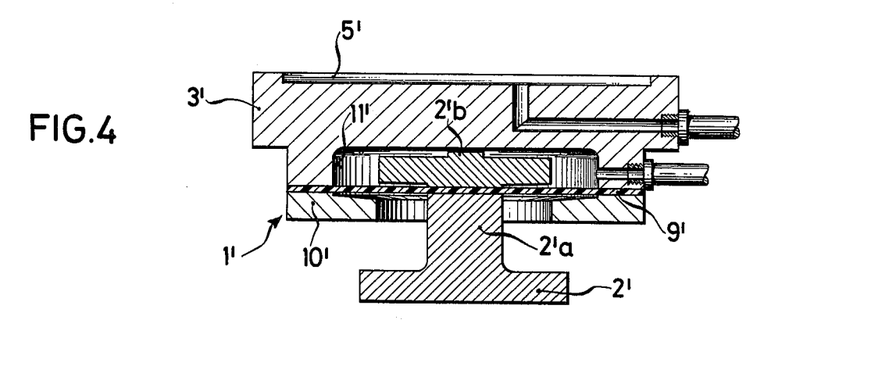
FIG. 4 is a vertical section (similar to FIG. 1) through a second embodiment of the invention.

FIG. 4 shows a slight modification of the embodiment of a bering unit 1' illustrated in FIGS. 1 to 3. In the interests of simplicity, only those parts which are modified in terms of construction will be described in detail, the remaining parts corresponding to those of FIGS. 1 to 4.

In this second embodiment, a space-saving construction is obtained in practice by reversing the effects of force. As can clearly be seen, the hydraulic chamber 11' is in this case machined into the underneath of the bearing shoe 3' so that the supporting membrane 9' is supported at its outer edge by the bearing shoe 3' and the peripheral wall of the hydraulic chamber 11' (on the underneath) in that this outer membrane edge is again secured by a supporting ring 10' in the same way as in the preceding embodiment. At its centre, the supporting membrane 9' is fixedly connected to the end 2'a of the base which projects into the hydraulic chamber 11', this end 2'a being pin-like and in two parts, just as in the preceding embodiment of the bearing shoe pin 3a, and the centre of the supporting membrane 9' being secured between these two parts of the pin. At its end directed upwards towards the top of the hydraulic chamber 11', the base 2 or its pin -like end 2'a again has a central recess 2'b which, if required, may be supported by that end of the bearing shoe 3' which faces it.

This bearing unit 1' functions on the same principle as the bearing unit 1 shown in FIGS. 1 to 3. In this case, however, the load applied to the bearing shoe 3' is diverted through the oil cushion present in the hydraulic chamber 11' into the supporting membrane which in turn is centrally supported on the extremely simple base 2'. Accordingly, the bearing shoe 3' is supported over a larger area by the hydraulic cushion than in the preceding embodiment, with the result that very few, if any, deformations can occur under load, which provides for a particularly light construction.

In this embodiment, too, the oil pocket 5' and the hydraulic chamber 11' are separately and directly fed.

Figure 5:
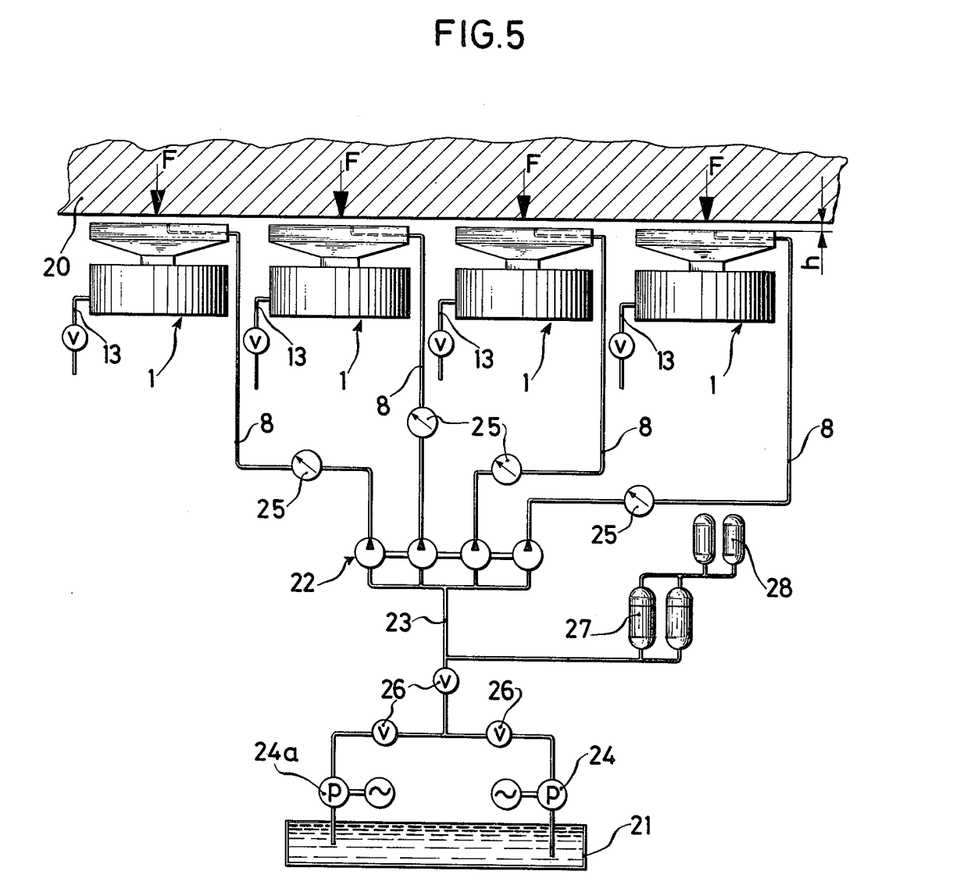
FIG. 5 diagrammatically illustrates a hydrostatic bearing assembly consisting of four hydrostatic bearing units according to the invention with a common oil feed system for the individual bearing units which may be of the type illustrated in FIGS. 1 to 4.

FIG. 5 diagrammatically illustrates a complete hydrostatic bearing assembly which comprises for example four hydrostatic bearing units 1 according to the invention of the type illustrated in FIGS. 1 to 3 and which is used for radially mounting a heavy rotating machine part 20 (merely indicated). Whereas the hydraulic chambers 11 of each bearing unit 1 are fed directly and separately through their feed pipe 13 (with a corresponding valve), the carrier oil feed lines 8 for each oil pocket 5 of a bearing shoe 3 are part of a feed line network for the hydrostatic bearing as a whole, so that the individual bearing units are controlled and monitored together. The feed lines 8 communicate with a common source for the carrier oil 21 through an oil flow distributor 22, a main feed line 23 and at least one motor-driven pump 24 (if necessary a reserve pump 24a may also be provided). Corresponding control devices (for example manometers 25) and valves 26 (especially in the main feed line) are present in the feed lines 8. In addition, the main feed line 23 may have connected to it a branch line 23a which preferably contains a hydroreservoir 27 and a pressure gas reservoir 28.

When the machine part is rotating, the bearing shoe 3 of the bearing units 1 are uniformly pumped up to this machine part until the same hydrostatic pressure prevails in the oil pockets 5. Once the same hydrostatic pressure is prevailing throughout an equally wide gap $h$ is present between the fillet-like edges 6 of the bearing shoe 3 and the rotating machine part 20, so that the machine part 20 is supported substantially equally by all the bearing units 1. When this is the case, no more oil need be delivered to the hydraulic chambers 11 (i.e. to the oil cushions). The feed lines 13 are shut off and the bearing shoes 3 are then fixed in the loading direction (arrows F) by the incompressibility of the oil cushions, although they are able to make gyrating movements by virtue of the elasticity of the supporting membranes, as a result of which the supporting membranes are correspondingly deflected and the oil cushions supporting them are correspondingly displaced in the hydraulic chamber 11.

By switching on an oil flow distributor 22, all four bearing units 1 or bearing surfaces 4 of the bearing shoe 3 are uniformly fed with hydraulic oil. Any fluctuations in load which may occur may be compensated by altering the gap width $h$ in accordance with the stiffness of the oil film.

The embodiment of a hydrostatic bearing described with reference to FIG. 5 with the bearing units shown in FIGS. 1 to 3 may of course also contain bearing units 1' (as shown in FIG. 4) instead of the bearing units 1 without necessitating any changes either in the hydraulic control system or in the mode of operation of this hydrostatic bearing.

Figure 6:
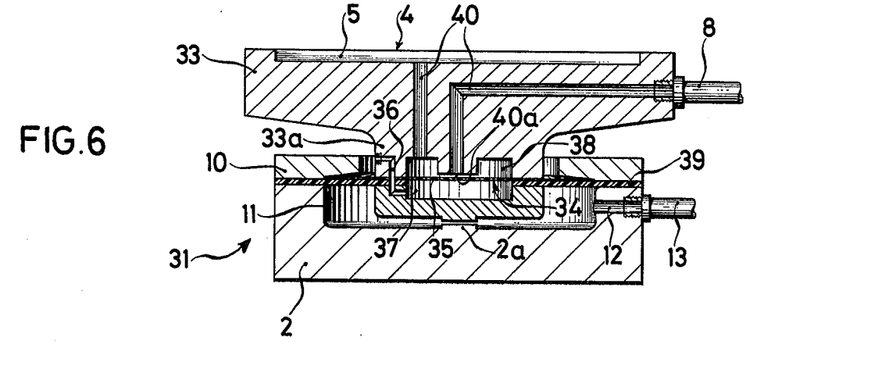
FIG. 6 is a vertical section (similar to FIG. 1) through another embodiment with an additional control membrane.

Another variant of a hydrostatic bearing unit 31 according to the invention is illustrated in FIG. 6. Since the embodiment has the same basic structure as the bearing unit 1 in FIGS. 1 to 3, substantially identical elements have been provided with the same reference numerals so that there is no need for them to be described in detail.

The lower end of the bearing shoe 33 which is considerably reduced in diameter to the point where it resembles a pin 33a again projects into the base 2 of this bearing unit 31 (i.e. into its hydraulic chamber 11). The outer edge of the supporting membrane 39 is also anchored between the peripheral wall of the hydraulic chamber 11 and the supporting ring 10, whereas the middle part of the supporting membrane 39 which, in this case, is preferably annular, is secured between the two parts of the bearing shoe pin 33a.

A control chamber 34 (seen in outline) is formed in this bearing shoe pin 33a substantially concentrically of the bearing shoe 33. This control chamber 34 is divided up by a control membrane 35, which runs substantially parallel to the supporting membrane 39 and to the bearing surface of the bearing shoe 33, into an air chamber 37 communicating with the atmosphere through a duct 36 and an oil chamber 38 communicating with the bearing surface 4. The feed duct 40 is guided through this control chamber 34, its orifice or orifices (opening into the oil chamber 38) being situated immediately opposite the centre of the control membrane 35. The configuration and arrangement of this orifice 40a is selected in such a way that variation of the distance between this duct orifice 40a and the control membrane 35 results in the formation of a throttle zone, in the form of a ring nozzle, through which the supply of carrier oil through the feed duct 40 to the bearing surface 4 is controlled in dependence upon the pressure prevailing in the oil pocket 5.

If, therefore, the static pressure in the oil pocket 5 increases, the pressure at the control membrane 35 also increases to the same extent and deflects it further towards the atmosphere (i.e. towards the air chamber 37) so that the gap between the orifice 40a and the control membrane 35 is increased and more carrier oil is able to flow to the oil pocket 5. An increase in pressure such as this in the oil pocket is produced by an increase in the load on the bearing shoe 33, in which case the gap between the bearing surface 4 and the rotating machine part supported by it is reduced corresponding to the stiffness of the oil film. In order to eliminate the danger of the machine part coming into contact with the bearing shoe 33, the gap may be increased again or brought to its required size by increasing the supply of oil, thereby enabling the increased load to be compensated.

If, by contrast, the load on the bearing unit 31 decreases, the pressure in the pocket 5 drops as, hence, does the pressure at the control membrane 35, resulting in a reduced supply of oil to the oil pocket 5.

Accordingly, by virtue of this bearing unit 31 according to the invention, fluctuations in load can be compensated by varying the supply of carrier oil, so that the gap between the bearing surface 4 and the corresponding machine part can be kept substantially the same. One considerable advantage of this bearing unit configuration (with the oil flow control accommodated in the bearing shoe 33) is that the controlled system can be kept extremely short, thereby avoiding dead times in the control characteristic.

Figure 7:
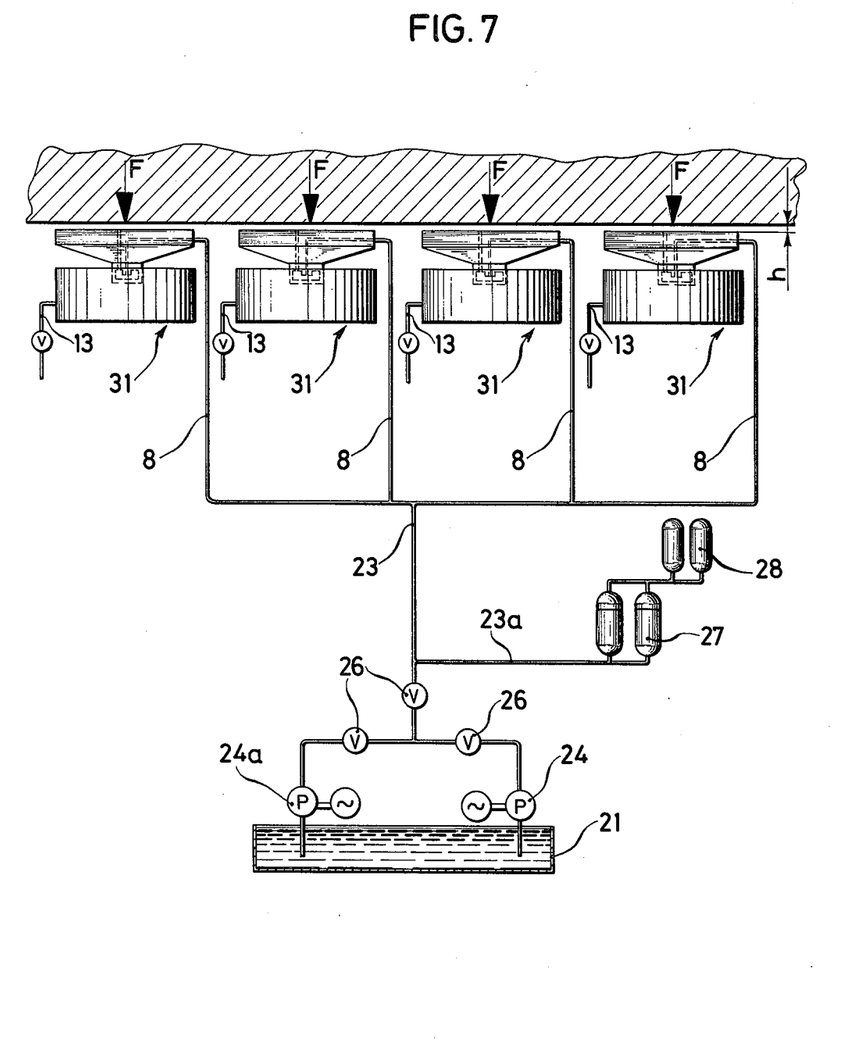
FIG. 7 diagrammatically illustrates (similarly to FIG. 5) a hydrostatic bearing assembly according to the invention comprising four hydrostatic bearing units of the type illustrated in FIG. 6.

A hydrostatic bearing assembly according to the invention containing four bearing units 31 (according to FIG. 6) is briefly compared in the following with reference to FIG. 7 with a hydrostatic bearing of the type shown in FIG. 5, all the same elements being provided with the same reference numerals so that there is no need for all the details of this bearing to be described.

It can be seen at first glance that, in this bearing (FIG. 7), the oil flow distributor 22 and the manometers 25 in FIG. 5 have disappeared. This is attributable above all to the possibility of control in the individual bearing units 31. The individual bearing units 31 and their bearing shoes may be fed with different carrier oil flows of which the level is controlled in dependence upon the individual loads of these bearing units 31 through the particular control chamber (with control membranes). Fluctuations in load may be compensated in the manner already described, so that a substantially equal gap width $h$ can be maintained.

The adjustability and precision setting of the bearing surfaces of each bearing unit 31 are again attributable, as in the first embodiments, to the hydraulic chamber which is directly connected through its feed duct to a separate oil feed line 13.

Figure 8:
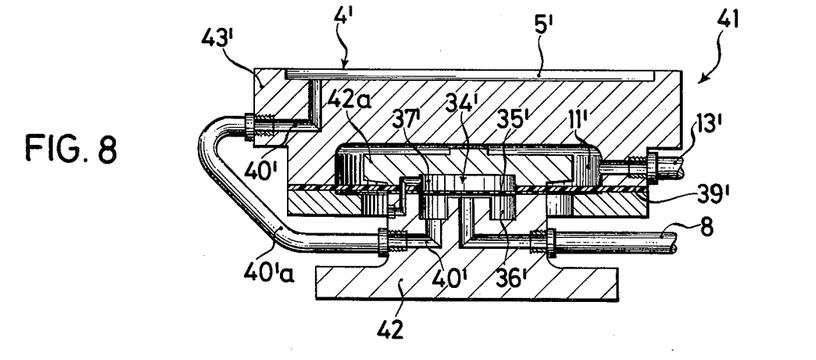
FIGS. 8, 9 and 10 are vertical sections (similar to FIG. 1) through another three variants of a hydrostatic bearing unit according to the invention.

FIG. 8 shows a variant of a bearing unit according to the invention which is essentially a further development of the embodiment illustrated in FIG. 4, a control chamber with a control membrane (as described with reference to FIG. 6) being used in this case, too. In contrast to the embodiment illustrated in FIG. 6, in which the control chamber is provided in the bearing shoe, the control chamber in the embodiment shown in FIG. 8 is accommodated in the base 42 of the bearing unit 41.

In this bearing unit 41, the bearing shoe may be designed in exactly the same way as in the bearing unit 1' shown in FIG. 4. Accordingly, all the remaining parts of the bearing shoe 3' are provided with the same reference numerals as in FIG. 4.

In addition, in the interests of simplicity, components which are substantially identical in design in FIGS. 6 and 8 are denoted by the same reference numerals, an apostrophe merely being added to the reference numeral in FIG. 8.

Accordingly, the bearing unit 41 shown in FIG. 8 comprises a base 42 in whose pin-like end 42 a (in two parts for accommodating the supporting membrane 39') projecting into the hydraulic chamber 11' is arranged, the control chamber 34' which is again divided up by the control membrane 35' into an air chamber 37' and an oil chamber 36'. In this case, therefore, part of the feed duct 40' for the bearing surface 4' or its oil pocket 5' extends in the base 42, this part of the feed duct 40' then being guided through the control chamber 34' in exactly the same way as in the embodiment illustrated by way of example in FIG. 6. This part of the feed duct 40' situated in the base 42 is connected with that part of the feed duct 40' situated in the bearing shoe 43' by a flexible connecting line 40'a.

Accordingly, the supply of oil to the hydraulic chamber 11' takes place separately from the supply of oil to the bearing surface 4' through the feed lines 13'.

The control function otherwise corresponds to that of the embodiment illustrated in FIG. 6. Instead of the bearing units 31, bearing units 41 of the type shown in FIG. 8 may of course also be used in the same way in a hydrostatic bearing of the type described with reference to FIG. 7 without necessitating any changes to the hydraulic system of the bearing.

Figure 9:
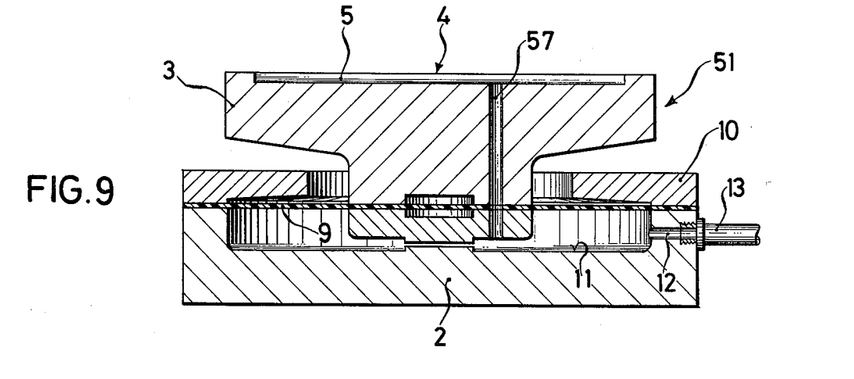

FIG. 9 shows a fifth embodiment comprising a hydrostatic bearing unit 51 which is substantially identical in structure with the embodiment shown in FIGS. 1 to 3, so that the same reference numerals have also been used for structurally substantially the same components.

The only difference between the embodiment illustrated in FIGS. 1 to 3 and the embodiment illustrated in FIG. 9 is that, in the embodiment illustrated in FIG. 9, the feed duct 57 carrying the carrier oil into the oil pocket 5 of the bearing surface 4 is guided right through the body of the bearing shoe 3 in such a way that, at its lower end, it opens out into the hydraulic chamber 11 of the base 2. By contrast, the feed duct 12 for the hydraulic chamber 11 is directly connected to its oil feed line 13 (as in the first embodiment) which, in this case however, is connected to the entire hydraulic feed system, based on complete hydrostatic bearing assembly of the type shown, for example, in FIG. 5. In this way, therefore, a common oil feed pipe 13 supplies oil to the bearing surface 4 and the hydraulic chamber 11. In the bearing unit 51, therefore, the oil pocket 5 communicates directly with the pressure chamber of the bearing base 2 below the supporting membrane 9, i.e. with the hydraulic chamber 11, so that the pressure in the oil pocket 5 and the membrane pressure are always the same and are determined by the size of the load acting on this bearing unit 51.

By selecting the ratio between the surfaces of the oil pocket 5 and the hydraulic chamber 11 below the supporting membrane 9, it is possible to influence the spring constant of the membrane-hydraulic system. Through the load-dependent membrane pressure, it is even possible to influence the dependence upon this load. This means that, with increasing load, the spring constant of the membrane-hydraulic system increases (just as is the case with the stiffness of the oil film). This bearing unit 51 according to the invention has better damping properties in the event of load surges than the bearing units 1, 1' shown in FIGS. 1 to 4.

By virtue of the dependence upon load of the spring constant of the membrane-hydraulic system, it is possible for this supporting membrane to be kept in a substantially neutral low-tension position in the event of only limited deflection, even despite fluctuations in load, which has a particularly positive effect upon the gyrating movement of the bearing shoe 3.

If this bearing unit 1 is regarded in conjunction with a complete hydrostatic bearing, such as is illustrated for example in FIG. 5, it is noticeable that; in this case, all the bearing units 51 are fed from the carrier oil source (reservoir 21) through their common oil feed pipe 13 (for the bearing surface 4 and the hydraulic chamber 11) in conjunction with the oil flow distributor. Accordingly, the feed lines 13 take the place of the feed lines 8 which may be eliminated.

It is of course also possible to apply the same principle as described with reference to the bearing unit 51 in FIG. 9 to a bearing unit of the type shown in FIG. 4.

Figure 10:
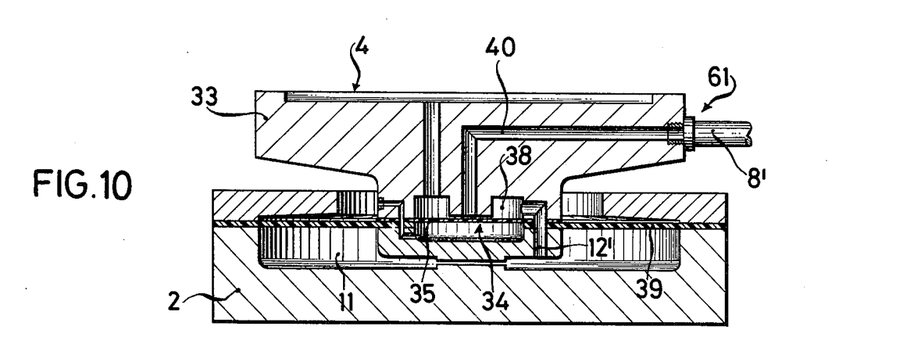

FIG. 10 shows a bearing unit 61 which has substantially the same construction as the bearing unit 31 shown in FIG. 6, except for the fact that the feed duct 12 for the hydraulic chamber 11, as used in FIG. 6, and hence also the feed line 13 have been left out and, instead, the oil chamber 38 of the control chamber 34 communicates directly with the hydraulic chamber 11 through a feed duct 12'. Since the remaining parts of this bearing unit 61 are substantially identical with those of the bearing unit 31 (FIG. 6), the same reference numerals have also been used where necessary.

Accordingly, the outcome is a hydrostatic bearing unit 61 according to the invention which through the control chamber 34 (with the control membrane 35) takes over the same controlling and throttling function as described with reference to FIG. 6. In addition to this, however, a common oil feed pipe 8' is provided for the bearing surface 4 and the hydraulic chamber 11, producing damping properties as good as those described in reference to FIG. 9. Accordingly, the bearing unit 61 of this embodiment of the invention affords substantially twice the protection against overloading. In the event of a load surge, the bearing shoe yields by virtue of the elasticity and spring constant of the membrane-hydraulic system, whilst at the same time the gap between the bearing surface 4 and the rotating machine part supported by it is kept substantially constant (by increasing the flow of oil). In this way, the bearing shoe 33 is safely prevented from coming into contact with the rotating machine part, even in the case of a heavily stressed bearing unit.

Another embodiment of the invention is illustrated with reference to FIGS. 11 to 13. The construction of this bearing unit 71 according to the invention is also based on the embodiment shown in FIG. 6. The base 2 with its elements is substantially identical with that shown in FIG. 6, so that once again the same reference numerals have been used.

A major difference which distinguishes the bearing unit 71 from the preceding embodiments is the fact that the bearing surface 72 of the bearing shoe 73 comprises several flat oil pockets 75a, 75b, 75c and 75d which are surrounded by a filletlike edge 74 and which are open towards the rotating machine part (not shown). These oil pockets 75a, 75d, which form rectangles (in outline) of substantially the same size, are preferably arranged symmetrically to the centre 72' of the bearing surface 72 in the manner illustrated in outline in FIG. 13. For supplying the bearing surface 72 with oil, the oil pockets 75a-75d are each connected to a branchedduct 76a-76d branched off from the feed duct 77 for the bearing surface 72.

Each branch duct 76a-76d is guided through a separate control chamber 78a, 78b, 78c and 78d which in turn is divided up by control membranes 79a, 79b, 79c and 79d into two chambers (oil chamber and air chamber) in the manner illustrated in FIG. 6, so that the same metering and control possibility as also described with reference to FIG. 6 is separately obtained for each oil pocket 75a-75d. The control chambers 78a-78d are accommodated in the reduced-diameter pin-like lower end 73a of the bearing shoe 73 which projects into the hydraulic chamber 11 of the bearing base 2.

Figure 13:
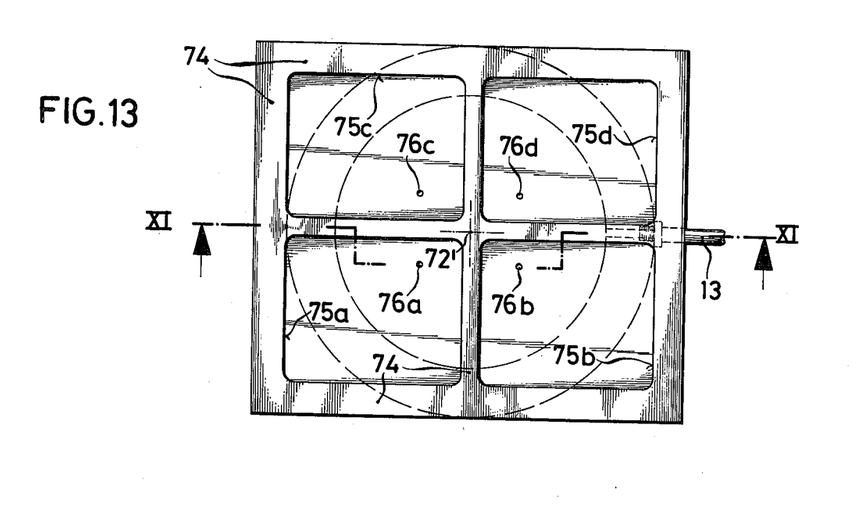
FIG. 13 is a plan view of the bearing unit shown in FIG. 11.
Figure 14:
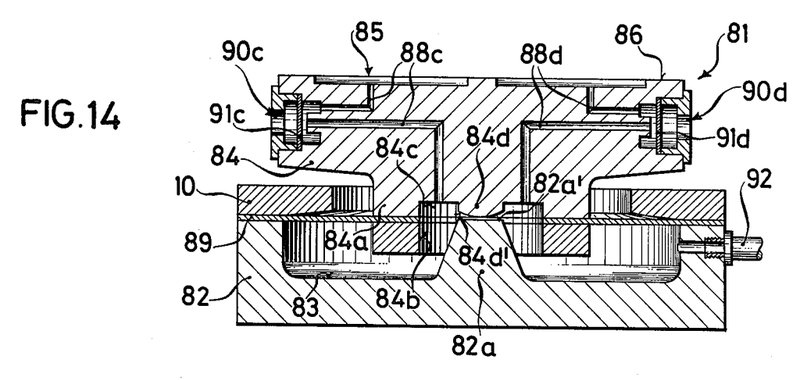
FIG. 14 is a vertical section (on the line XIV—XIV in FIG. 15) through another embodiment of the invention.
Figure 15:
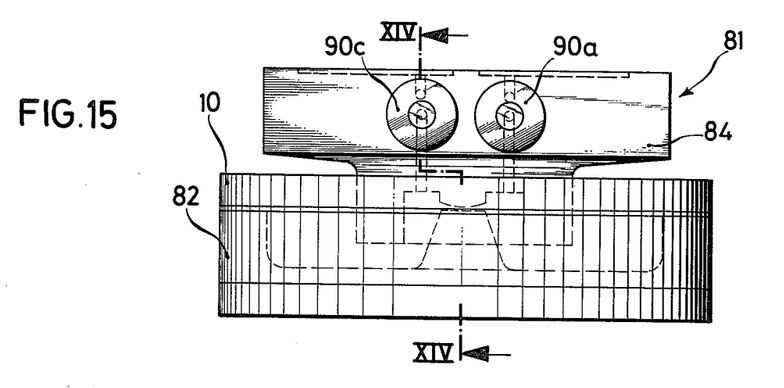
FIG. 15 is a side elevation of the bearing unit shown in FIG. 14.
Figure 16:
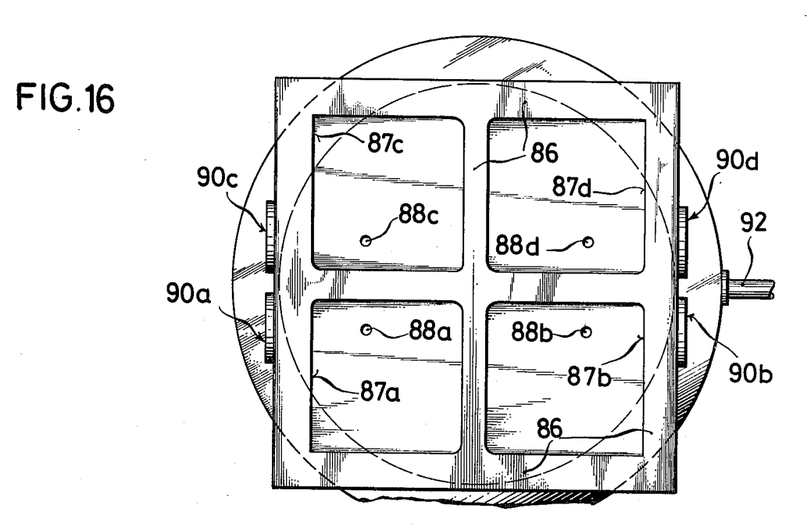
FIG. 16 is a plan view of the bearing unit shown in FIG. 14.

Another variant of a bearing unit 81 according to the invention is shown in FIGS. 14 to 16. Basically, this variant may be regarded, from the point of view of function, as a combination of the embodiments illustrated in FIGS. 9 and 11 to 13.

By comparison with the embodiments illustrated in FIGS. 9 and 11 to 13, the only difference in the bearing base 82 is that the central projection 82a in the form of a recess is extended so far upwards inside the hydraulic chamber 83 that its flat or spherical free end 82a' lies substantially in the plane of the supporting membrane 89 which, in this case, is annular. In this case, the reduced-diameter pin-like end 84a of the bearing shoe 84 projecting downwards into the hydraulic chamber 83 has a central recess 84b on whose upper base 84c is formed a downwardly projecting central projection 84d which, with its spherical free end surface 84d', is situated substantially coaxially opposite the end surface 82a' of the projection 82a in such a way that, when the projections 82a and 84d rest on one another (in the event of overloading of the bearing shoe), the favourable gyrating movement of the bearing shoe 84 is in no way impaired.

Figure 11:
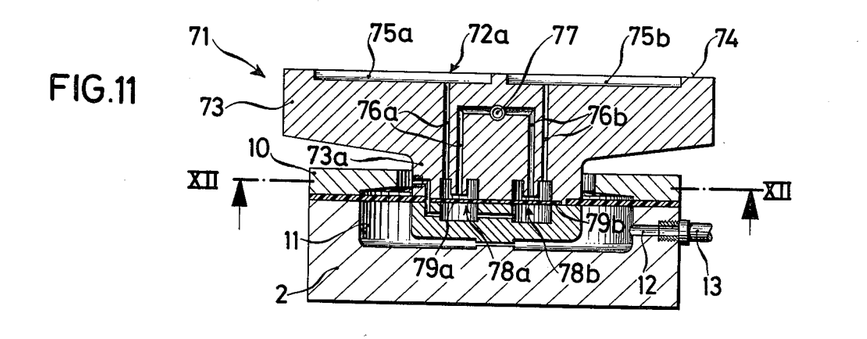
FIG. 11 is a vertical section (on the line XI—XI in FIG. 13) through another embodiment comprising several oil pockets in the bearing surface and a control membrane for the oil pockets.
Figure 12:
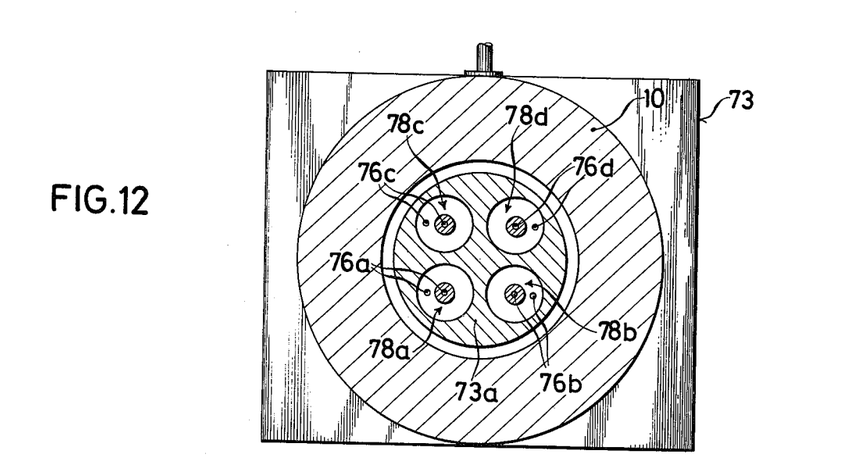
FIG. 12 is a cross-section on the line XII—XII in FIG. 11.

In the same way as in the embodiment illustrated in FIGS. 11 to 13, the bearing surface 85 of this variant is also divided by fillet-like edges 86 into flat oil pockets 87a, 87b, 87c and 87d which are open towards the machine part and which are in the form of rectangles of substantially equal size, as can clearly be seen from the plan view of FIG. 16. As in the preceding embodiment, each oil pocket 87a to 87d is fed with oil by component ducts 88a to 88d, these component ducts, as can clearly be seen from FIG. 14, opening into the recess 84b which in turn directly communicates at its downwardly open end with the hydraulic chamber 83. Accordingly, the oil pockets 87a to 87d of the bearing surface 85 are directly fed from the hydraulic chamber 83 in the base 82, just as in the embodiment illustrated in FIG. 9, so that for this purpose only one oil feed line 92 is required both for the hydraulic chamber 83 and for the bearing surface 85. In this variant, too, each component duct 88a to 88d has its own control chamber 90a to 90d with a control membrane (for example 91c and 91d). In contrast to the preceding embodiment, however, these control chambers 90a to 90d are provided at the outer peripheral sides of the bearing shoe 84 in such a way that they are readily accessible from outside, as illustrated in FIGS. 14 to 16 of the accompanying drawings. As clearly shown above all in FIG. 14, these control chambers may be formed by corresponding recesses into which plug-like elements provided with internal openings and with a communicating opening to the atmosphere can be introduced from outside.

In a modification, not shown in detail, of the variant illustrated in FIGS. 14 to 16, the control chambers with the control membranes may be eliminated so that, in this case, the four oil pockets of the bearing surface are directly connected to the hydraulic chamber of the bearing base by four straight component ducts. This provides each oil pocket with a mode of operation of the type explained in conjunction with FIG. 9.

Figure 17:
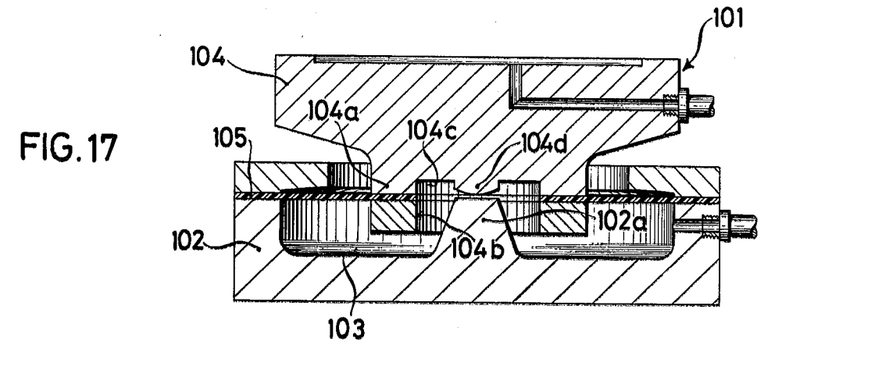
FIG. 17 is a variant of the embodiment illustrated in FIGS. 1 to 3.

Finally, FIG. 17 is a vertical section through a bearing element 101 which is substantially similar to the embodiment illustrated in FIGS. 1 to 3. Structurally, the bearing base 102 is made in exactly the same way as the bearing base 82 in the variant illustrated in FIGS. 14 to 16 so that, therefore, it comprises the central projection 102a provided with a flat orspherical free end surface in the hydraulic chamber 103. By contrast, the bearing shoe 104 which, at its upper end, is identical with the bearing base 3 of FIGS. 1 to 3 has a pinlike part 104a projecting into the hydraulic chamber 103 which, in principle, is designed in exactly the same way as described in reference to FIG. 14, i.e. with a central reces 104b from whose base 104c a projection 104d provided with a spherical end surface again projects downwards. Since in this case, too, the supporting membrane 105 is annular in shape, the end surfaces of the projections 104d and 102a come into contact with one another in the event of overloading of the bearing shoe and, in this case, too, the gyrating movement of the bearing shoe 104 is maintained.

The bearing units 71, 81 and 101 of the last three embodiments described are particularly suitable for mounting heavy rotating machine parts over large areas.

It is obvious that, in addition to the embodiments described above, the invention lends itself to numerous other modifications and further developments. In all the embodiments described, the base of the bearing, the bearing shoe, the hydraulic chamber and the supporting membrane, as seen in plan, are preferably arranged symmetrically to one another so that favourable loads are always obtained for the bearing units.

We claim:

1. In a hydrostatic bearing unit for rotating parts, more especially a radial bearing unit for heavy machine parts, such as drums, comprising a fixed base, a bearing shoe supported above said base for limited gyration with respect to said base and for hydraulic adjustment with respect to the rotating machine part and which comprises a bearing surface at the top surface of said bearing shoe fed with hydraulic carrier medium; the improvement therein comprising said base defining a hydraulic chamber, said bearing shoe including a pin extending into said hydraulic chamber toward engagement with the inner portion of said hydraulic chamber, a supporting membrane extending over said hydraulic chamber and connected to said base and to said pin, conduit means in communication with said hydraulic chamber for pressurizing said chamber and supporting said membrane and said bearing shoe on a body of hydraulic fluid with the pin of said bearing shoe out of engagement with the inner portion of said hydraulic chamber whereby the bearing shoe is free to gyrate with respect to said base.

2. A bearing unit as claimed in claim 1, characterised in that a projection extends from a central portion of at least one of the facing surfaces of said pin and said hydraulic chamber.

3. A bearing unit as claimed in claim 1, characterised in that the supporting membrane consists of a single layer.

4. A bearing unit as claimed in claim 3, characterised in that the supporting membrane is made of metal.

5. A bearing unit as claimed in claim 1, characterised in that the supporting membrane consists of several layers.

6. A bearing unit as claimed in claim 5, characterised in that the individual layers of the supporting membrane are made of the same material.

7. A bearing unit as claimed in claim 5, characterised in that the layers of the supporting membrane are made of different materials.

8. The bearing assembly of claim 1 and further including a first projection extending from the central portion of said hydraulic chamber, said projection extending toward the plane of said supporting membrane, a recess defined in the central portion of said pin opposite said first projection, a second projection formed within said recess and facing said first projection.

9. A bearing unit as claimed in claim 1 and further characterised in that said base includes an inwardly extending supporting ring which has a smaller internal diameter than said hydraulic chamber and which extends over said supporting membrane.

10. A bearing assembly comprising a base, a hydraulic chamber defined in said base, a membrane connected to said base and extending over said hydraulic chamber, a bearing shoe supported above said base and including a downwardly extending pin extending into the hydraulic chamber of said base, said membrane being connected to said pin, a bearing surface formed on one surface of said bearing shoe, at least one oil pocket formed in said bearing surface, first conduit means for supplying oil under pressure to said oil pocket, second conduit means communicating with said hydraulic chamber for moving fluid under pressure into said hydraulic chamber whereby the membrane is expanded to support the bearing shoe and the bearing shoe is tiltable with respect to the base.

11. The bearing assembly of claim 10 and wherein said first conduit means communicates between said oil pocket and said hydraulic chamber.

12. The bearing assembly of claim 10 and wherein said bearing surface defines at least two flat oil pockets arranged substantially symmetrically with respect to the center of said bearing surface, said oil pockets being surrounded by a fillet-like edge and opening towards the rotating machine part.

13. The bearing assembly of claim 12 and wherein said first conduit means comprises a branch duct associated with one of said oil pockets.

14. A bearing assembly comprising a base, a bearing shoe positioned over said base, one of said bearing shoe or said base defining a hydraulic chamber, the other of said bearing shoe or said base defining a pin extending into said hydraulic chamber toward engagement with the inner portion of said chamber, a membrane extending over said chamber and connected at its outer edge portion to said chamber and connected at its inner portion to said pin, conduit means in communication with said chamber for supplying liquid under pressure to said chamber and supporting said bearing shoe on a body of hydraulic fluid with the pin out of engagement with the inner portion of said hydraulic chamber so that the bearing shoe is free to gyrate with respect to said base, said bearing shoe including a bearing surface defining a recess therein, and conduit means in communication with said recess for supplying liquid under pressure to said recess for supporting a load on a hydraulic bearing surface.

15. A bearing assembly as claimed in claim 14, characterised in that said conduit means comprises separate feed ducts for said bearing surface and said hydraulic chamber.

16. A bearing assembly comprising a base, a hydraulic chamber defined in said base, a membrane connected to said base and extending over said hydraulic chamber, a bearing shoe supported above said base and including a downwardly extending pin extending into the hydraulic chamber of said base, said membrane being connected to said pin, a bearing surface formed on one surface of said bearing shoe, at least one oil pocket formed in said bearing surface, a first feed duct for moving fluid under pressure into said hydraulic chamber, at least one control chamber defined as an internal cavity in said bearing assembly, a control membrane dividing said control chamber into two chambers, one of said two chambers being an air chamber communicating with the atmosphere and the other said chambers being an oil chamber, a second feed duct for supplying oil under pressure to said oil chamber, said second feed duct having its outlet orifice opening into said oil chamber at a position approximately opposite the center of said control membrane and juxtaposed said control membrane, a third feed duct for supplying oil from said oil chamber to said oil pocket in said bearing surface.

17. The bearing assembly of claim 16 and wherein said first feed duct communicates with said oil chamber of said control chamber and hydraulic chamber.

18. A bearing unit as claimed in claim 16, characterised in that the control chamber is provided in the bearing shoe.

19. A bearing unit as claimed in claim 16, characterised in that the control chamber is provided in the base of the bearing assembly.

* * * * *